(12) United States Patent
Rutkowski

(10) Patent No.: US 6,470,591 B2
(45) Date of Patent: Oct. 29, 2002

(54) BICYCLE RIDING POSITION MEASURING DEVICE

(76) Inventor: John C. Rutkowski, 499 Nottingham Ave, Eugene, OR (US) 97404

( * ) Notice: Subject to any disclaimer, the term of this patent is extended or adjusted under 35 U.S.C. 154(b) by 0 days.

(21) Appl. No.: 09/681,818

(22) Filed: Jun. 11, 2001

(65) Prior Publication Data

US 2001/0049882 A1 Dec. 13, 2001

Related U.S. Application Data

(60) Provisional application No. 60/210,728, filed on Jun. 9, 2000.

(51) Int. Cl.$^7$ ................................................ G01B 5/14
(52) U.S. Cl. ........................................ 33/832; 33/470
(58) Field of Search ............................... 33/832, 1 BB, 33/452, 456, 464, 483, 484, 485, 833, 451, 613, 459, 460, 461, 462, 472, 473

(56) References Cited

U.S. PATENT DOCUMENTS

| 709,487 A | * | 9/1902 | Hughes | ...................... 33/451 |
| 760,297 A | * | 5/1904 | Basola | ...................... 33/460 |
| 5,243,765 A | * | 9/1993 | Lynch | ...................... 33/203.19 |
| 5,461,794 A | * | 10/1995 | Huang | ...................... 33/470 |

OTHER PUBLICATIONS

Greg LeMond and Kent Gordis, Complete Book of Bicycling, 1987, G.P. Putnam's Sons, p. 136, ISBN 0–399–13229–5.*
FitStik (Trademark), CycleMetrics Fit Systems (Copyright 1999–2002); Eugene, OR 97404 (May 21, 2002)—"About Us" & "Frequently Asked Questions".*

* cited by examiner

Primary Examiner—Diego Gutierrez
Assistant Examiner—Tania Courson

(57) ABSTRACT

A device for measuring five parameters which define the riding position of a bicycle, which device may also be used as a jig to guide adjustment. The five parameters measured are: position height, saddle setback, saddle angle, reach to the bars, and bar angle The device treats these parameters as functions of a given rider's anatomy, and compensating adjustments factor out changes in crank length, height of shoe sole or height of pedal which would otherwise alter a rider's "reach" to the pedals. The device includes the scales and gauges needed to perform all measurements or to be used as a jig, as well as the fittings needed to attach it to a bicycle. No other tools are needed, and no disassembly of the bicycle, including crank bolts or cranks, is needed.

5 Claims, 6 Drawing Sheets

BICYCLE RIDING POSITION MEASURING DEVICE

This application claims priority from U.S. Provisional Application Serial No. 60/210,728 filed Jun. 9, 2000

BACKGROUND OF INVENTION

This invention relates to a measuring device for measuring and setting various parameters related to a cyclist's riding position on a bicycle.

To a performance cyclist, the fit of a bicycle, like the fit of a runner's shoes, is very important. Changes as small as one centimeter to the relative positions of the saddle, handlebars, or pedals can have a dramatic affect on the rider's performance, comfort, enjoyment and risk of injury. The more advanced and highly trained the rider, the more important precise fit becomes. Accordingly, a great deal of effort is expended achieving proper fit.

Ironically, after a particular bike has been adjusted to a particular rider, whether by painstaking trial-and-error or, as the product of a fitting session, it is not easy to replicate that riding position on another bike. Instead, riders and bike mechanics make adjustments by eye or feel, or use an unwieldy collection of levels, rulers, strings and straightedges, or a combination thereof. These efforts are at best time-consuming and demand substantial skill in order to achieve acceptable results, and are often imprecise and fruitless.

Individually these tools are easy to use. However, adjusting the fit of a bicycle frequently requires two or more dimensions to be tracked simultaneously. For example, although no generally agreed upon coordinate system for bicycles exists, the following four measures are common: vertical height of the saddle above the bottom bracket called "saddle height," the vertical distance between the saddle and handlebars, called "drop," the distance of the saddle's nose behind the bottom bracket, called "setback," the horizontal distance between the saddle and handlebars, called "nose to bars." However, since the saddle is raised and lowered by sliding the post to which it's attached in or out of a non-vertical seat tube, moving the seat post in or out changes both the x and y components of its location, i.e., moving the seat "up" also moves the seat back, and vice versa. Referring back to the earlier defined measurements it's clear that adjusting "seat height" also changes the values of "nose to bars," "drop," and "setback".

In 1956, prolific bicycle industry innovator Tullio Campagnolo developed a jig-like device for setting saddle position. A photo of this can be seen on page 136 of Greg LeMond's Complete Book of Bicycling (ISBN 0-399-13229-5). The device is largely unknown in America, perhaps because in 1956 the American market for high-end bikes was virtually non-existent.

Examination of the picture shows that its object was to simultaneously integrate the vertical height of the saddle, the horizontal position of the saddle with respect to the bottom bracket, and the angle of the saddle with respect to the horizontal. These features if nothing else would simplify adjustments, because repositioning a saddle to align with a jig is clearly easier than repositioning a saddle by manually re-measuring between each approximation. However, along with these advantages, examination of the photo reveals limitations that would prevent its use on many modern bicycles, and shortcomings, which if overcome, would improve its usefulness on any bicycle.

First, said device was attached to the bike by means of a rigid clamping structure adapted to clamp to the top tube, and was held perpendicular to the top tube. Since all top tubes at the time were level, round and exactly 1⅛" in diameter, this arrangement would have been somewhat satisfactory. However, many if not most modern racing bicycles are made with top tubes whose diameters are larger than 1⅛", and/or whose cross-sections are complexly non-circular, and/or whose cross-sections vary complexly along the tube's length, and/or which are not level, i.e., the device could not be attached to many of today's bicycles at all.

Second, it appears that the device doesn't incorporate its own consistent measuring system. As earlier mentioned, it was apparently more jig than measuring device.

A further consequence of not providing a measuring system and indexing off the top tube is that when moving the device to different bikes, even those of the day, the jig itself would usually need to be readjusted and calibrated before the bike could be adjusted.

Additional study of the problems involved in bike fitting show that changing the length of a bicycle's cranks changes the "reach" of a rider's legs to touch the pedals, as does changing to different cycling shoes and/or different pedal systems. The combined impact of these differences can range from zero to an inch or more, the latter figure being one that all but the most position-insensitive cyclists would find objectionable if not painful and possibly injurious. Typically, when changing to components with different vertical dimension components, cyclists adjust the numeric value used to describe their correct position rather than changing the point from which they measure. Thus, typical measuring equipment and techniques fail to adequately deal with riding position quantification as a function of the rider's anatomy.

Therefore, it is an object of the present invention to provide a device which may be used to measure the riding position on any bicycle, and which may be adjusted so as to act as a jig to accurately guide the adjustment of a bicycle to a desired riding position.

It is another object of the present invention that all dimensions be measured in relation to a coordinate system incorporated in said invention, rather than in relation to the repositionable components themselves.

It is still another object of the present invention to provide a method and means whereby said device factors out variations in crank length, shoe sole thickness, or pedal system height, so that a measured riding position "height" remains the same for that rider regardless of variations in these components.

Moreover, it is yet another object of the present invention to provide a method and means whereby said device may be rapidly and easily attached to and aligned with and used on a bicycle without necessitating disassembly of said bicycle.

In addition, it is another specific object of the present invention that the device be alignable with a bicycle's bottom bracket without removal of the crank or crank fixing bolts of the bicycle.

Further, it is yet another object of the present invention that said method and means of attachment and alignment not be affected by the size, shape, cross-section, or angular relationship of a bicycle's tubes.

SUMMARY OF INVENTION

The device of the present invention measures position height, saddle setback, saddle angle, reach, and bar angle in relation to a vertical reference line extending upwardly from the center of the bottom bracket, and parallel to the vertical, horizontal, and longitudinal planes of the bike.

"Position Height" is the vertical distance from the insole of the rider's shoe to the intersection of the vertical reference line and a line extended across the top of the saddle (the "saddle line").

"Saddle Setback" is the distance from the intersection of the vertical reference line and the saddle line (the "intersection point") to the back of the saddle measured along the saddle line. Other arbitrary reference points on the saddle could be used instead of the back.

"Saddle Angle" is the angle between the vertical reference line and the saddle line.

"Reach" is the distance from the intersection point to the top center of the handlebar's tubular cross section at a point along the handlebar's width where said handlebars are approximately perpendicular to the longitudinal plane of the bike when the front wheel is pointing straight ahead. Other arbitrary reference points on the handlebar could be used instead of the top center.

"Bar angle" is the angle between the vertical reference line and a line extended from the intersection point to the top center of the handlebar.

A key element of the present invention is that said device can measure position height as defined above without connecting to any part of the bicycle below the bottom bracket. This is accomplished by offsetting the gradations of the vertical scale by an amount equal to "a phantom crank/shoe/pedal," then physically shifting the position of the vertical scale by the amount needed to alter the effective length of the "phantom crank" to match any probable actual crank, shoe, & pedal combination.

Another key element of the present invention is a crank adaptor, which can align itself with the commonly used crank fixing bolts. By providing a hole on the device of the present invention to admit said crank adaptor at the desired reference point, said reference point is thus aligned with the bottom bracket of any bike without necessitating the removal or loosening of the crank fixing bolt or crank. The design of the crank adaptor accomplishes the preceding in a manner which prevents the crank fixing bolt from applying rotational forces to the crank adaptor or visa versa, which would otherwise greatly complicate attachment or use of the device.

The device of the present invention consists of two primary physical modules, a support section and a measuring section, which is attached to said support section.

Said support section is fashioned as two vertical parts, slidably connected to and aligned with each other by means of a clamping mechanism, which vertical division permits the aforementioned compensation adjustments to be made. The uppermost of the two vertical parts is marked with a vertical scale. Said reference unit also incorporates a crank adapter which aligns the device with the bottom bracket, and provides the two means by which said device is attached to a bike, the first of which is a hook and loop strap located near the crank adaptor.

The second attachment means constitutes a key element of the present invention because it allows said device to be slidably attached to bike top tubes of any probable shape, dimension, cross-section or angular displacement. In addition, because said second attachment means attaches said upper portion slidably, said support section can be shifted forward or backward with respect to said vertical reference line while stably attached, thus providing the means whereby both gross and minute vertical adjustments to said support section can be made. Said second attachment method further provides the means whereby said support section can be made parallel to both the longitudinal and vertical axes of the bike.

Said measuring section consists of a longitudinal measuring component aligned and calibrated to quantify the linear distance at any point upon said longitudinal measuring component's length from the point where said longitudinal measuring component's linear axis intersects said vertical reference. Said longitudinal measuring component further incorporates a gauge for convenient determination of the exact point along said longitudinal measuring component's length to which said linear distance is to be measured. Said longitudinal measuring component is attached to said measuring section in a fashion which allows it to measure linear distances both in front of and behind said vertical reference line with respect to the longitudinal axis of the bicycle. In addition, the longitudinal measurement component can be offset with respect to the centerline of the bike while remaining parallel to said centerline; which allows said longitudinal measuring component to avoid aspects of a bicycle which would otherwise prevent measurements, and further allows said longitudinal measuring component to better interact with the upper surfaces of a saddle.

Said measuring section also incorporates a gauge which quantifies the angular relationship of said longitudinal measuring component with said vertical reference. Furthermore, said measuring section is attached to said support section by a third attachment means which includes a means of quantifying the vertical position of said measuring section along said vertical reference. In addition, said third attachment means attaches said measuring section to said support section in a manner which permits said measuring section to be slidably or fixedly positioned with respect to said support section.

DETAILED DESCRIPTION

Figure 1:
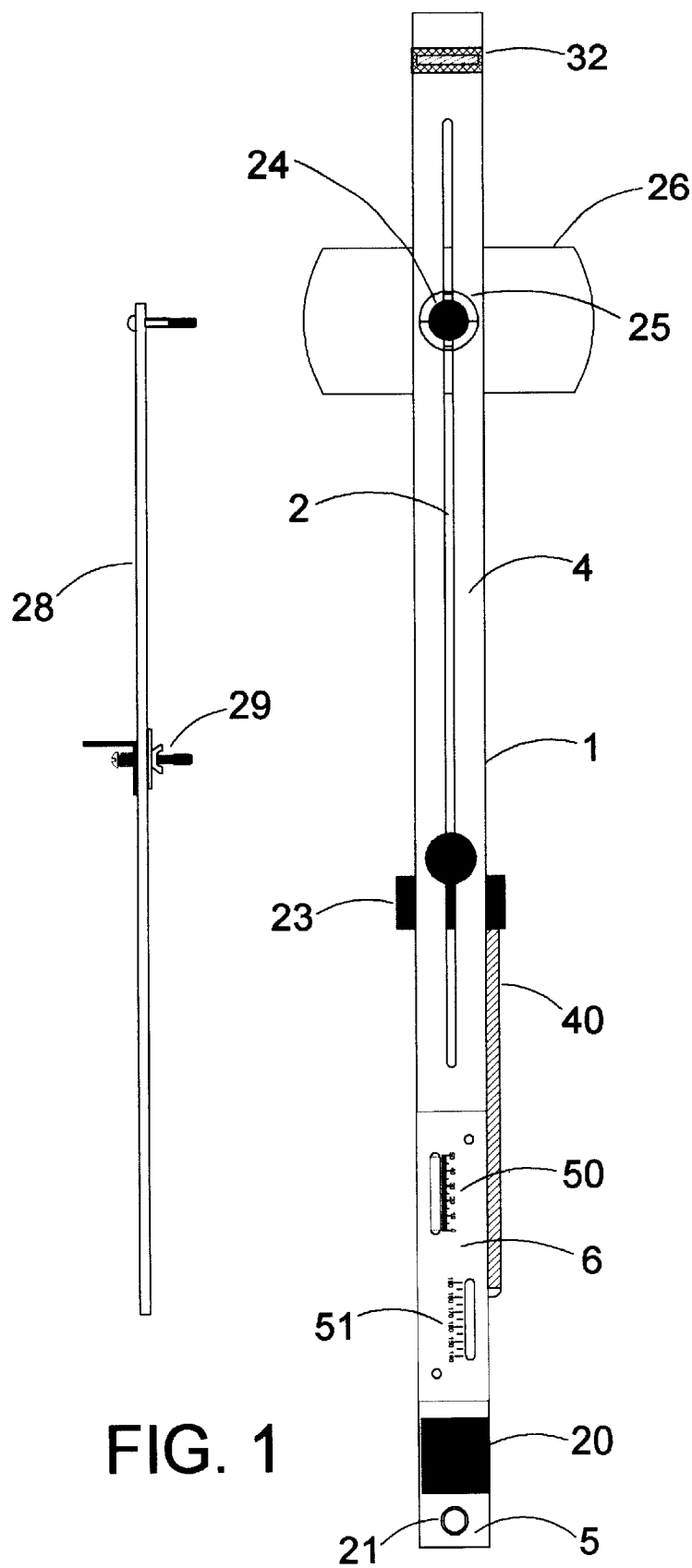
FIG. 1 is a front plan view of the device with the longitudinal ruler detached but correctly oriented.
Figure 2:
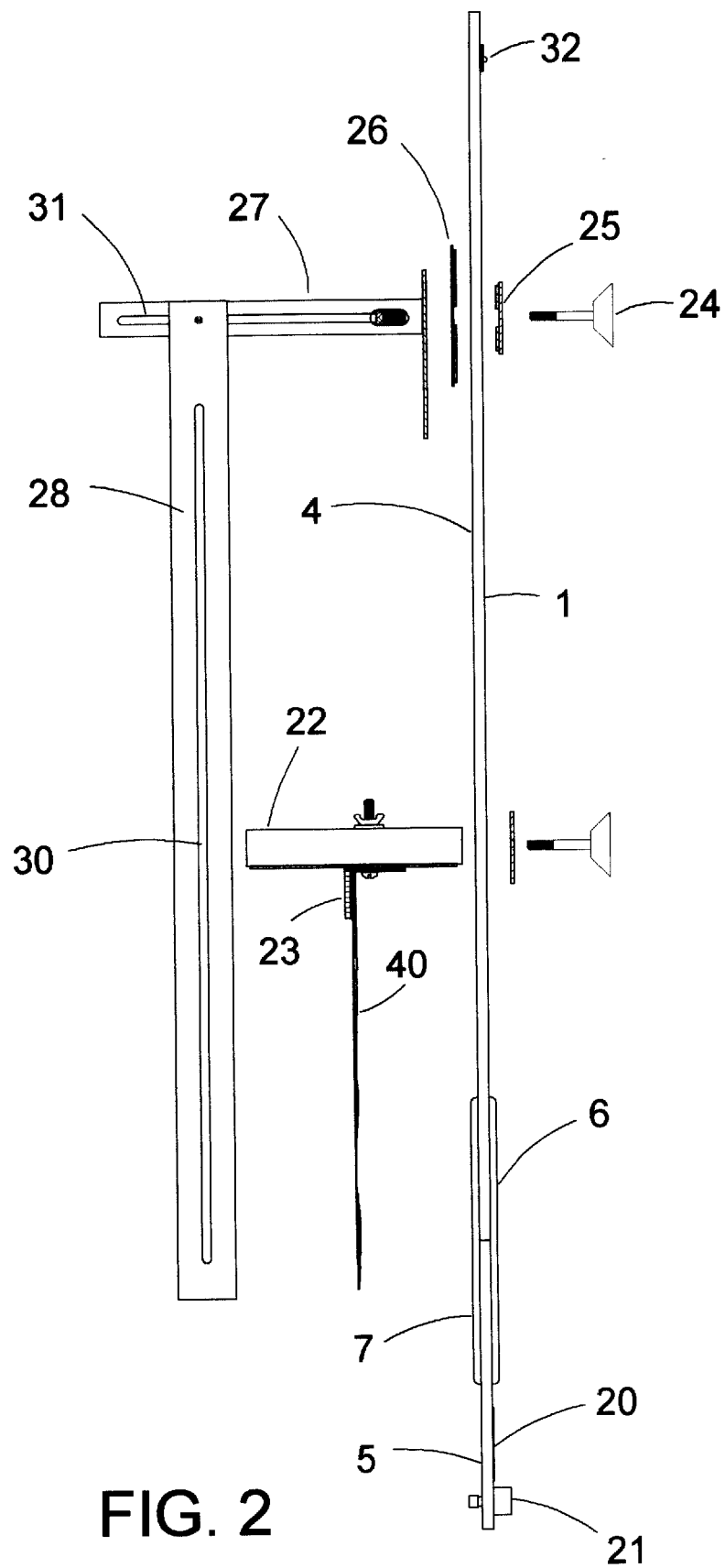
FIG. 2 is a right plan view with both the second attachment means and the component of the measuring section shown in exploded view.

A Measuring device and adjusting guide for bicycle riding position parameters incorporating various features of the present invention is illustrated generally by FIG. 1 and FIG. 2.

The device consists of a main stick 1 through which a slot 2 is fashioned for the greater portion of said stick's length, and which slot is closer to the top of the main stick 1 than the bottom. The face of the main stick is marked with vertical gradations in centimeters.

Figure 3:
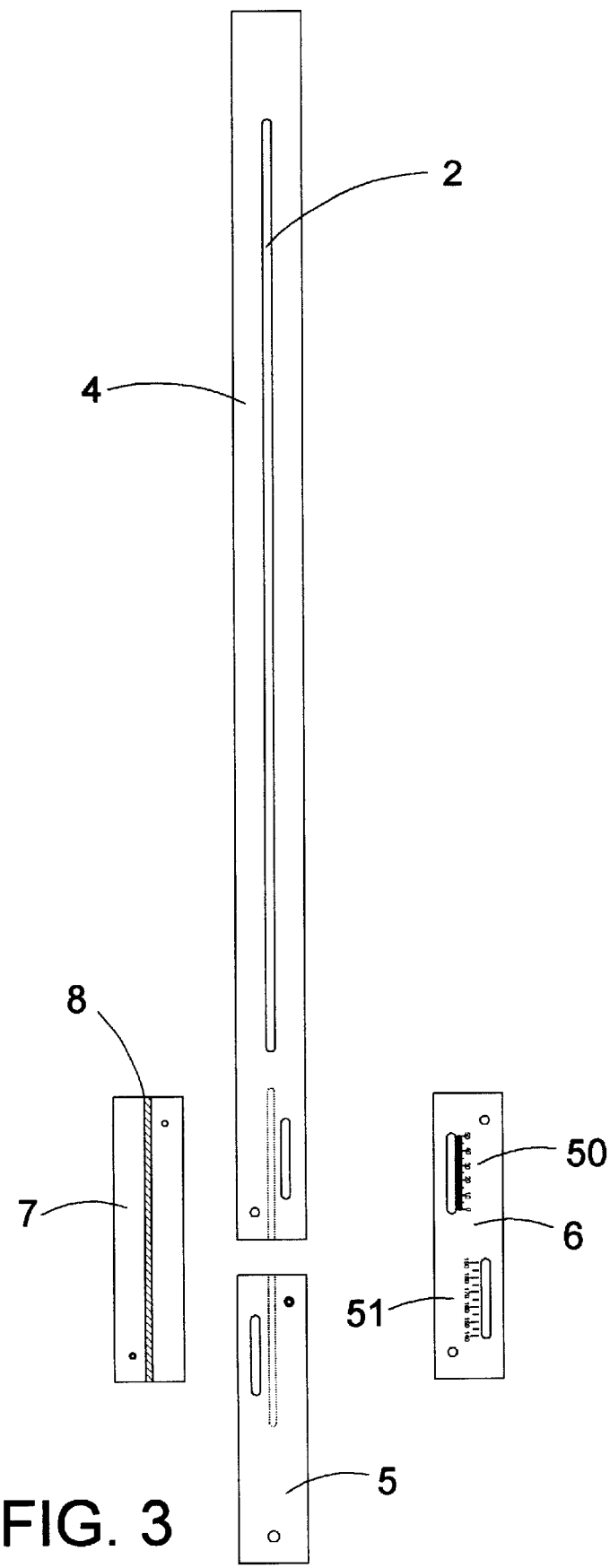
FIG. 3 is a front plan view of the top main, bottom main, scale face and scale back.

As can be seen in FIG. 3 the main stick 1 is comprised of two parts, called the top main 4 and the bottom main 5.

These two parts are securely but movably aligned with each other by means of a clamping mechanism comprised of two flat clamping parts whose width, thickness and length are similar to that of bottom main 5.

Top main 4 and bottom main 5 are aligned end to end, and one of the clamping parts, called the scale face 6, is placed so as to overlap both equally, and the second clamping part known as the scale back 7 is placed behind the parts.

The four pieces, which together comprise main stick 1, are fashioned with a set of cooperating slots and holes.

Figure 4:
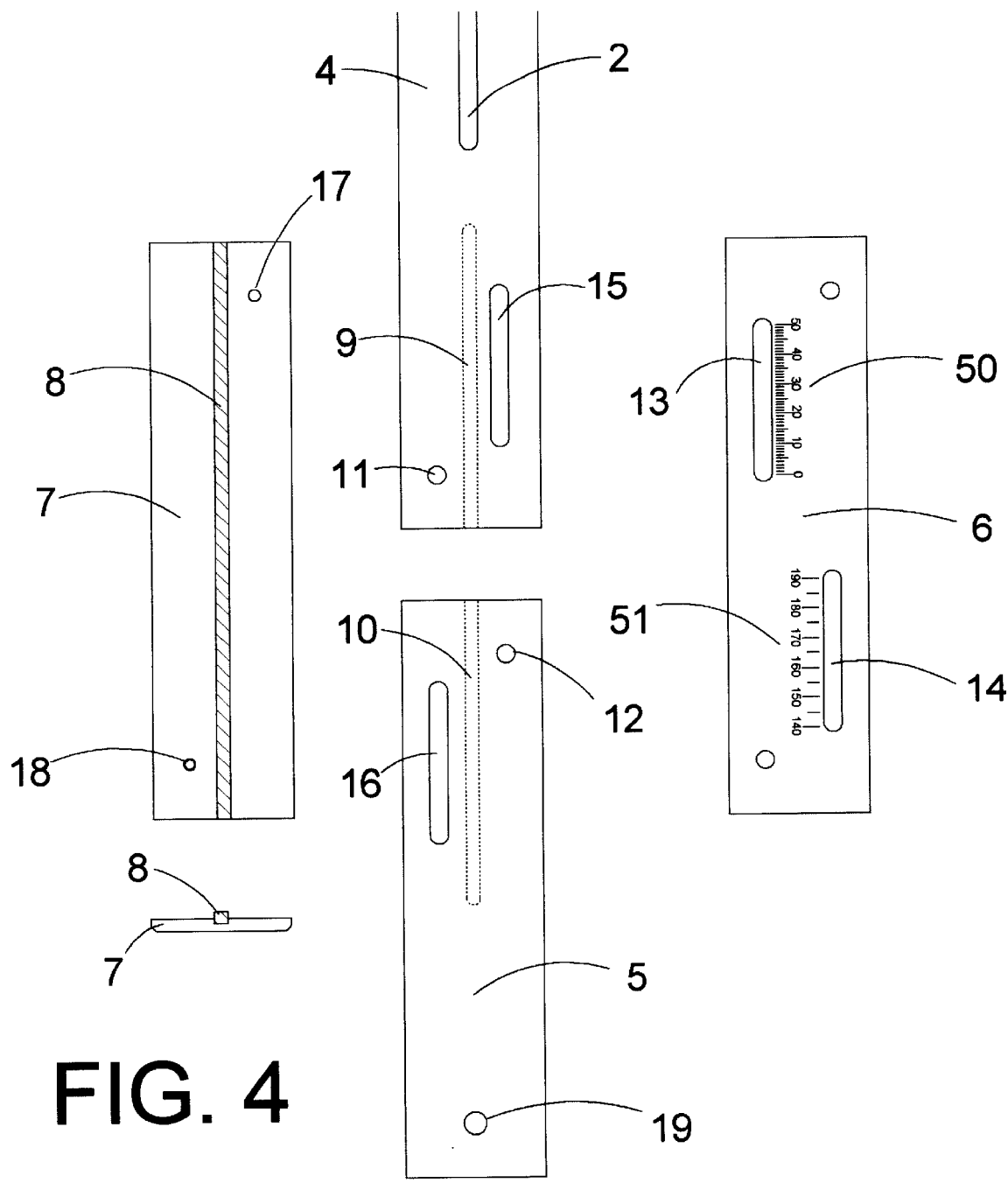
FIG. 4 is a front plan detail view of the top main, bottom main, scale face and scale back.

Scale back 7 includes a slot fashioned proximally along its length in which a rectangular key 8 is secured. This key 8 cooperates with slots of similar cross section but shorter length fashioned on the rear-facing sides of both the main top 4 and main bottom 5. These slots and other features of the clamping system are shown more clearly on FIG. 4.

Top main key slot 9 and bottom main key slot 10 are both precisely aligned with slot 2.

Small cylindrical scale stops whose first purpose is to limit the distance top main 4 and bottom main 5 can move with respect to each other, and whose second purpose is to provide a gauge against which to measure the amount of such movement are attached at holes 11 and 12 provided for that purpose.

Said scale stops engage slots 13 and 14 in scale face 6, and compensation scales for crank length (50) and for shoe sole/pedal height (51) are marked on said scale face.

Small clamping knobs extend through holes 15 and 16 on scale face 6, pass through clearance slots 15 and 16 in main top 4 and main bottom 5, then engage threads provided for the purpose in holes 17 and 18 fashioned in scale back 7.

Yet another feature of main bottom 5 is a crank adapter mounting hole 19 fashioned near its bottom end, which is aligned precisely with the axis of slot 2.

The device is attached to a bike at two points. The first attachment point 20 is located on main bottom 5 just above crank adaptor 21 and consist of a stretchable attachment strap (40), such as VELCRO® (hook and loop) material and a supplied VELCRO® (hook and loop) strap that facilitates attachment to other bike parts.

Figure 5:
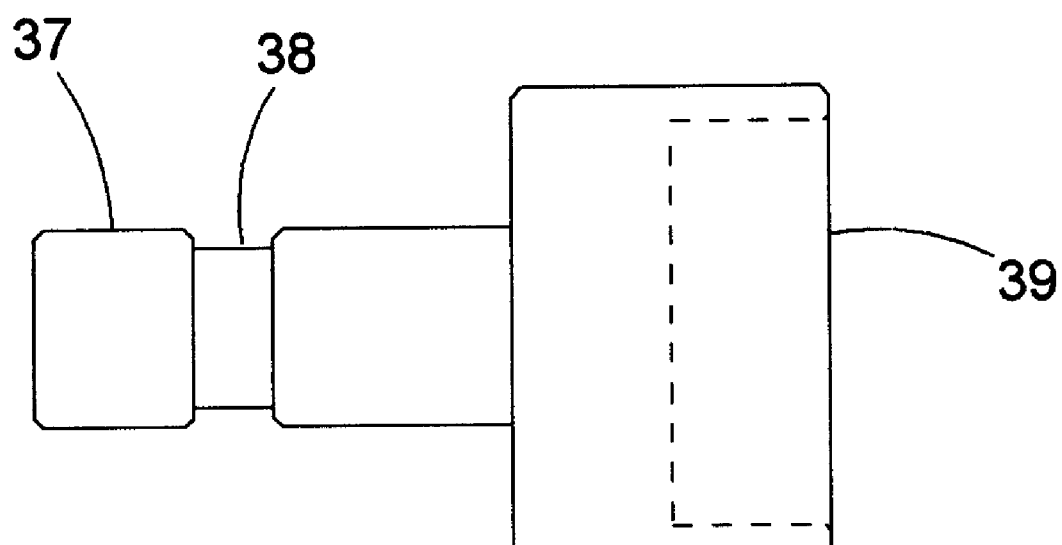
FIG. 5 shows a cross-sectional view of the crank adapter.

Crank adapter 21 is shown in greater detail in FIG. 5, which is a cross-sectional side view. Stud 37 may be inserted into the crank adapter mounting hole 19 from either side of main stick 1, thus presenting either stud 37 or hole 39 to the bike. It is retained in the crank adapter mounting hole by means of a hitch clip or other common device urged around annular ring 38 which is machined in stud 37.

The second attachment point consists of a stabilizer bar 22, stabilizer bracket 23, which may be seen on FIG. 1 and FIG. 2, and a stretchable attachment strap (40), such as a VELCRO® (hook and loop) strap. Stabilizer Bar 22 is slidably and rotatably attached through slot 2. Stabilizer Bracket 23 may be slid along the axis of stabilizer bar 22 through a slot fashioned along its length, and rotated about its axis on the bolt used to attach it to stabilizer bracket 22.

Figure 6:
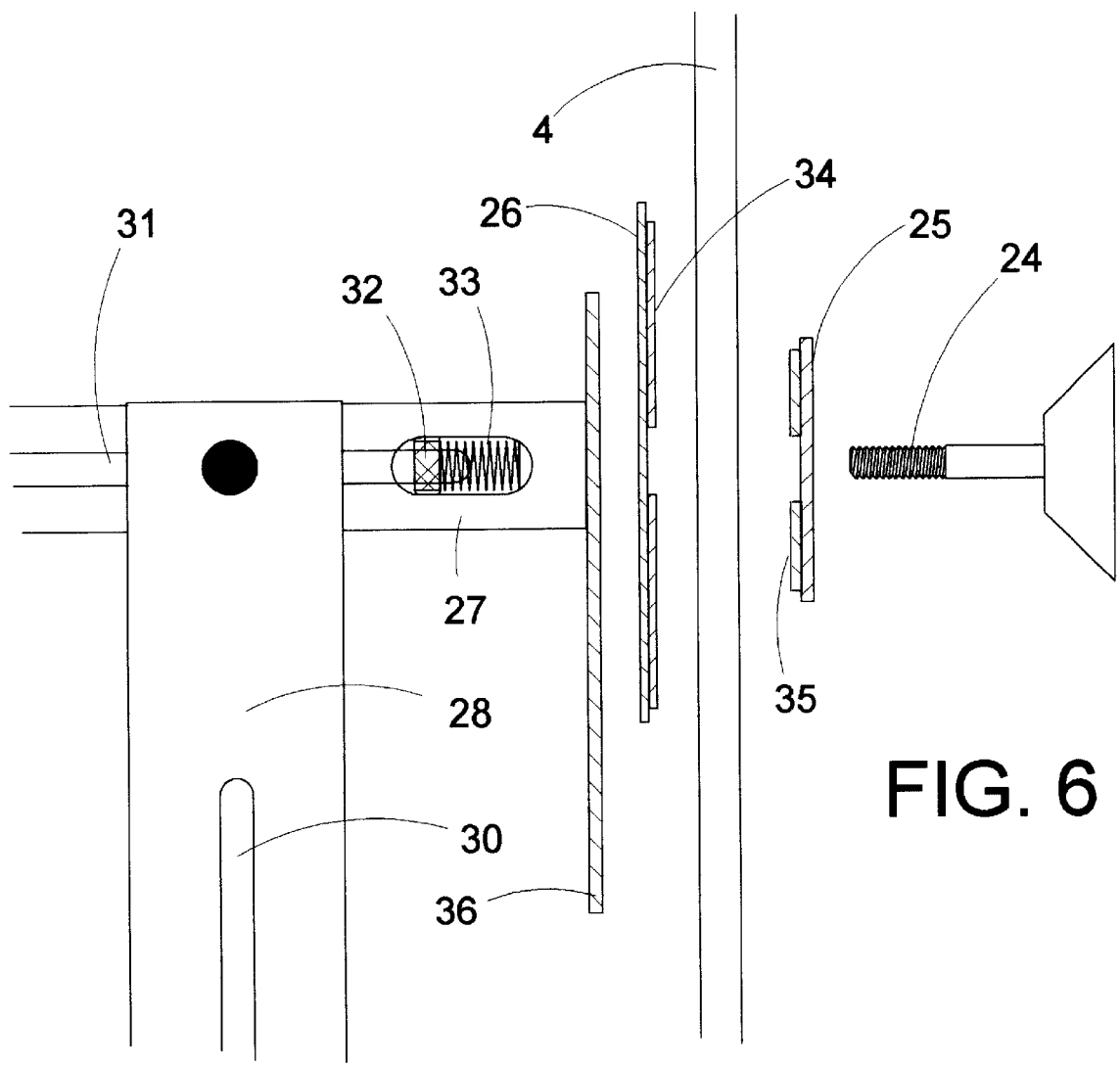
FIG. 6 shows a detail view of parts comprising the measuring section.

A measuring unit composed of clamping knob 24, scale pointer 25, main dial 26, mounting post 27, longitudinal ruler 28 and longitudinal gauge 29 allow accurate measurements with respect to slot 2. Vertical position height is read at scale pointer 25. These parts are seen in greater detail in FIG. 6.

Scale pointer 25 is equipped with two guide pieces 35 on one side, and main dial 26 is likewise equipped with two guide pieces 34, which guide pieces are inserted into the slot 2, and serve to keep these pieces with rotating about the threaded stud of clamping knob 24, which stud passes through scale pointer 25, main stick 1, main dial 26 and into mounting post 27, and spring 33, where it is engaged into nut 32. Clamping knob 24 thus pulls the pieces together, increasing the tensions as spring 33 is compressed.

Pointer 36 is attached to the end of mounting post 27, and shows the angular relationship between the two parts when its position is compared to gradations on the face of main dial 26.

Longitudinal ruler 28 has linear gradated scales marked on both sides, and longitudinal gauge 29 provides a stud shaped gauge on one side, and presents a flat gauging surface on the other, and may be easily slid along the length of longitudinal ruler 28 via ruler slot 30 fashioned along the length of longitudinal ruler 27.

Longitudinal ruler 28 may be repositioned horizontally with respect to the axis of the bike by means of slot 31 fashioned in the length of mounting post 27.

A spirit level 32 is attached near the top of main stick 1.

I claim:

1. A measuring device and adjustment guide for various positional parameters of a bicycle, said device comprising a support section to which a measuring section is attached, said support section including a main stick which provides a vertical reference in relation to which all said positional parameters are measured, vertical gradations against which vertical relationships to said vertical reference are gauged, a main slot extending through said main stick and serving as a vertical alignment means for vertically aligning the main stick, an attachment hole near a lower end of said main stick, said attachment hole being in vertical alignment with said main slot, a crank adapter which cooperates with said attachment hole and is aligned with said vertical reference, wherein said crank adapter is vertically aligned with the center of a bottom bracket of a bicycle, a first attachment means situated near said crank adaptor and said attachment hole which cooperates with various elements of the bicycle for removably yet stably attaching a portion of said main stick to the bicycle, a second attachment means for removably and slidably attaching a second portion of said main stick to the top tube of the bicycle, and;

a third attachment means for attaching said measuring section to said main stick at a point higher than said second attachment means;

wherein said third attachment means slides easily along the length of said vertical alignment means yet remaining longitudinally aligned with it, wherein said third attachment means aligns said measuring section with said vertical reference by first being passed through said vertical alignment means from the front of said main stick and then engaging holes on components of said measuring section;

wherein said third attachment means also provides a means of altering by degree from slidable to fixed the condition of attachment between said support section and said measuring section, and wherein said measuring section includes an angular measurement component possessing two guide pieces mounted upon one of the faces of the main stick, which face is oriented so as to bring said guide pieces into contact with said vertical alignment means, such that said angular measurement component slides along the length of said main stick yet remain longitudinally and angularly aligned with it, and;

wherein said angular measurement component incorporates a means of comparing and quantifying its angular relation to that of a mounting post whose primary axis extends perpendicularly rearward with respect to said vertical reference; said mounting post slidably accepting a longitudinal measuring component oriented such that its angular relation to said mounting post is the same as said measuring post's angular relation to said vertical alignment means, and;

wherein said longitudinal measuring component is perpendicular to the primary axis of said mounting post and is at all times parallel to the longitudinal axis of the bicycle, and whose distance from the vertical reference of the main stick may be varied by sliding said longitudinal measuring component along the length of said mounting post;

said longitudinal measuring component having a longitudinal gauge attached, the linear distance of said longitudinal gauge from the intersection of said longitudinal measuring component with said vertical reference being quantified by means of scales marked upon said longitudinal measuring component.

2. The measuring device and adjustment guide of claim 1, wherein said second attachment means consists of a post whose primary axis extends perpendicularly rearward with respect to both said vertical reference and the longitudinal axis of the bicycle;

said post is mounted slidably and rotatably to said main stick;

a bracket is mounted for swivelling and sliding with respect to said post, and;

a stretchable attachment strap is connected at one end of said bracket, wherein said strap is wrapped around a point on the top tube of the bicycle then reattached to another point on said bracket.

3. The measuring device and adjustment guide of claim 1, an upper end of said main stick is slowly urged forward and backward relative to said vertical reference, while the lower end of said main stick remains aligned with the bottom bracket of the bicycle by said crank adapter, wherein a forward and backward adjustment provides a means for fine tuning the vertical adjustment of said main stick, and;

wherein a spirit level is attached near the upper end of said main stick for indicating verticality of said main stick.

4. The measuring device and adjustment guide of claim 1, wherein said main stick is further divided into two parts, one short part and one long part, the short part is a bottom part and the long part is a top part, and said main stick further including;

a means of vertically displacing said vertical gradations on said top part of said main stick in relation to said crank adapter reference hole on said bottom part of said main stick, and;

a clamping mechanism for rigidly fixing the vertical displacement of said top and bottom parts in any desired relationship, and;

an alignment means for fixedly maintaining the vertical alignment between said top part and said bottom part as though they were one part, and;

wherein accurate scales are marked upon said clamping mechanism, said scales represent a crank length and a combined shoe sole/pedal height, and said scales permit the degree of vertical displacement to be precisely adjusted.

5. The measuring device and adjustment guide of claim 1, wherein each end of said crank adapter engages and automatically centers itself with respect to one of two common styles of crank fixing bolts, and; said crank adaptor is inserted through said attachment hole on said main stick from either side of said main stick, thereby enabling the user to choose which end of the crank adaptor faces the bike.

* * * * *